A. RUPP.
PROPELLER.
APPLICATION FILED MAR. 18, 1919.
1,318,805.
Patented Oct. 14, 1919.
3 SHEETS—SHEET 1.
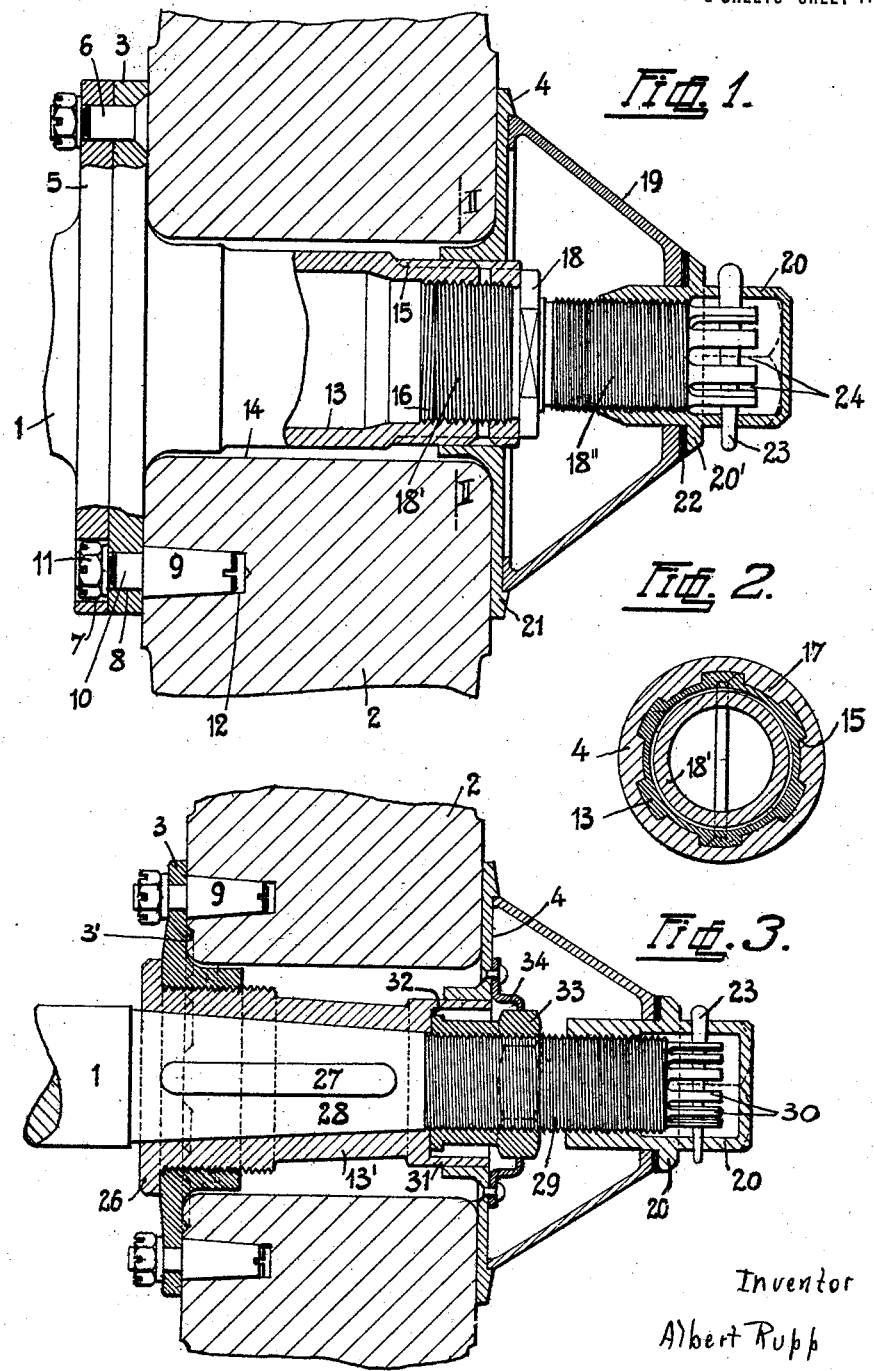
Inventor
Albert Rupp
by
his Attorney A. RUPP.
PROPELLER.
APPLICATION FILED MAR. 18, 1919.
1,318,805.
Patented Oct. 14, 1919.
3 SHEETS—SHEET 2.
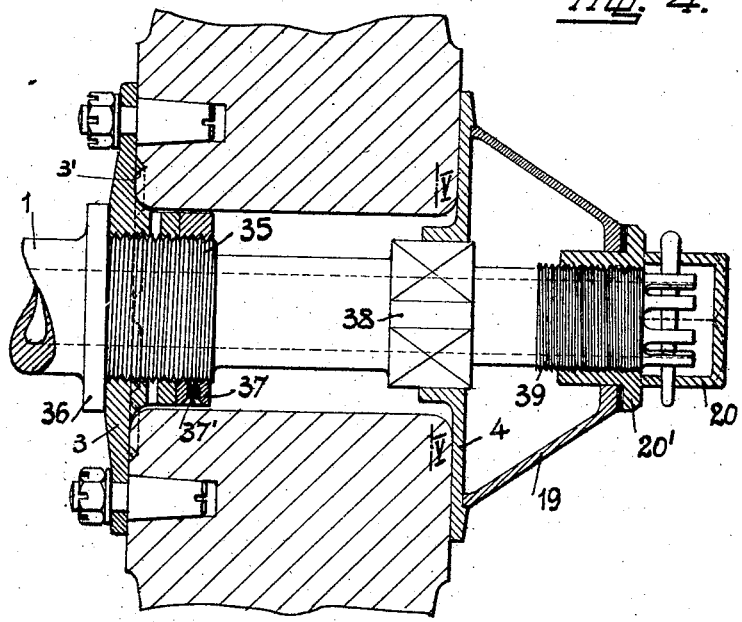
Fig. 4.
Fig. 5.
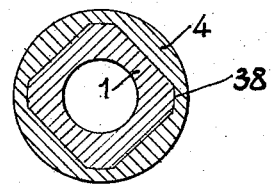
Inventor
Albert Rupp
by [signature]
his Attorney

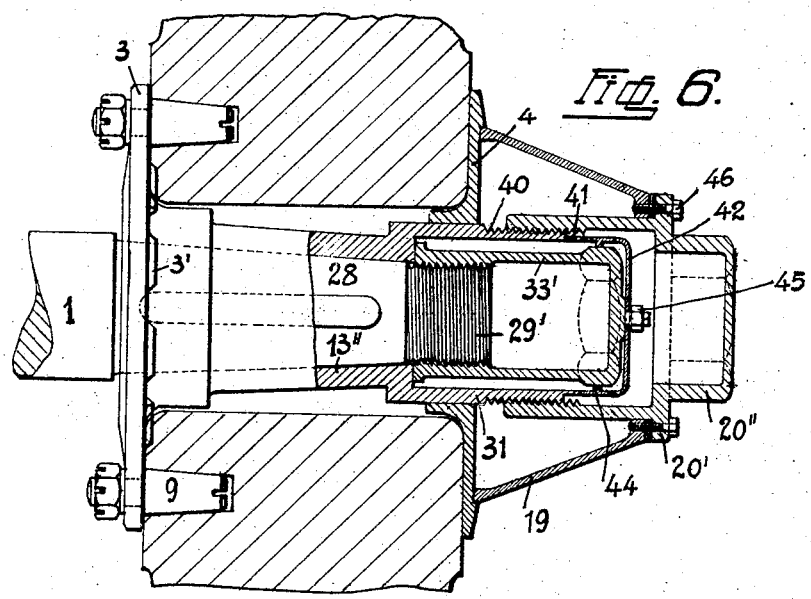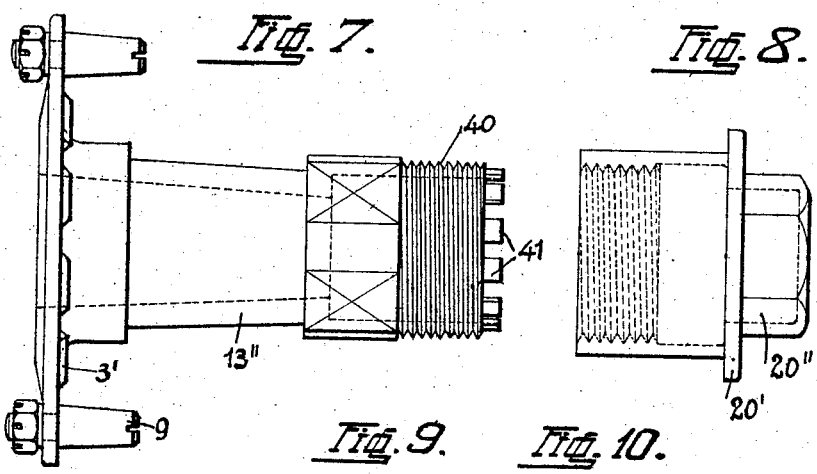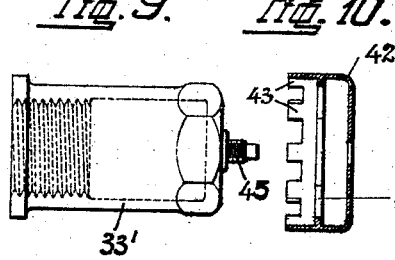

PATENT OFFICE.

ALBERT RUPP, OF EICHBUHL, NEAR THUN, SWITZERLAND.

PROPELLER.

1,318,805.   Specification of Letters Patent.   Patented Oct. 14, 1919.

Application filed March 18, 1919. Serial No. 283,405.

*To all whom it may concern:*

Be it known that I, ALBERT RUPP, a citizen of the Swiss Confederation, and residing at Eichbuhl, near Thun, Switzerland, have invented certain new and useful Improvements in Propellers, of which the following is a specification.

The present invention has reference to new and useful improvements in propellers and relates more particularly to improved means for quickly and securely attaching the propeller to the motor shaft, and the invention is directed to improved means firstly for clamping the propeller boss between two flanges, secondly for jamming one of the flanges against the propeller, thirdly for connecting the other flange to the motor shaft, and fourthly for interconnecting the two flanges.

My invention will best be understood when described in connection with the accompanying drawings in which Figures 1, 3, 4 and 6 represent axial sections through as many constructional modifications of propeller connections according to my invention; Fig. 2 is a section on line II—II of Fig. 1; Fig. 5 is a section on line V—V of Fig. 4, and the Figs. 7-10 represent detail parts of the modification according to Fig. 6. Like reference numerals denote like parts in the several figures.

Referring first to Fig. 1 the reference numeral 1 denotes the shaft end, 2 the propeller hub, and 3 and 4 respectively the two flanges between which the propeller is to be clamped. The flange disk 3 is connected to the flange disk 5 of the motor shaft by a plurality of screw bolts 6. The flanges are provided intermediate the bores for these bolts 6 with bores 7 and 8 respectively, through which are passed countersunk screw bolts 10 having conically tapering heads 9. A nut 11 threads on the outer end of these bolts 10 and the flange 3 is clamped between the nuts 11 and the annular shoulders presented by the enlarged heads 9. These conical heads 9 snugly fit into registering bores in the propeller boss, as at 12, so that the propeller is taken along upon the motor shaft being rotated. The flange member 3 forms an integral part of the hollow hub 13 which latter passes through the central bore 14 of the propeller and is provided on the outer circumference of its contracted forward end with longitudinal grooves 15 and on the respective inner wall with a screw thread 16. The inner wall of the central bore of the flange 4 is provided with longitudinally directed ribs 17 which dovetail with the grooves 15 in the hub end, so that the flange 4 can be displaced on the hub end in longitudinal but not in angular direction.

Into the thread 16 screws the one end 18' of a double nipple 18 and is secured against working loose in suitable manner. For pressing the flange 4 against the propeller cheek, that is to say for clamping the latter between the two flange members 3 and 4, there is provided a hollow conical head 19 and a lock nut 20. The large end of the cone member engages behind an annular shoulder 21 in the flange. The lock nut 20, which is provided with a flange 20', is screwed onto the free end 18'' of the nipple 18, its flange 20' and an interposed packing ring 22 pressing against the flattened or inturned apex of the cone, clamping thereby the several parts. The lock nut 20 is secured against inadvertently becoming detached by a cotter or split pin 23, which is driven through alined perforations in the nut wall and registering castellations 24 in the front end of the nipple 18.

In the construction according to Fig. 3 the flange member 3 is screwed on left-handed thread onto the hub 13' close up against the hub shoulder 26. The use of a left thread has the advantage that the propeller cannot work loose between the flanges, as the flange 3 is caused to be displaced toward the flange 4 by the reaction of the propeller. The hub 13' is conically bored out and is fixed against relative rotation on the conical portion 28 of the motor shaft by means of the key 27. The motor shaft terminates in a threaded portion 29 with a series of annularly disposed tongues 30 for the passage of the cotter pin 23. The hub 13' terminates in an annular cup-shaped housing 31, presenting a shoulder 32 close against which is screwed a nut 33, whereby the hub is secured on the propeller shaft against longitudinal displacement. The boss of flange 4 is shoved over the housing 31 and a ring member 34 of hexagonal opening secured to the flange grips the hexagon nut 33 and thereby prevents the latter from becoming loosened. The lock nut 20 screws onto the threaded shaft end 29, the parts being substantially constructed and coöperating as above described with reference to Fig. 1.

This latter construction has the advantage over the first above described arrangement that if the propeller should accidentally strike the ground and the flange 4 should in consequence have become distorted, it would be necessary to replace only this flange and not the entire hub.

The same advantage is obtained by the construction according to Figs. 4 and 5, in which the flange 3 is screwed directly onto a left threaded portion 35 of the motor shaft 1, which latter has an integral shoulder 36, a jam nut 37, which may itself be secured against working loose for instance by a set screw 37', preventing the flange from unscrewing. The flange 4 is seated on a substantially square collar portion 38 of the shaft and is thereby prevented from relative rotation. The forward end of the propeller shaft is provided with a thread 39 onto which screws the lock nut 20, as above described in detail.

The construction shown in Figs. 6–9 is a combination of the two modifications of Figs. 1 and 3, in as far as here the flange 3 is integral with the hub 13″. The flange 3 is provided with radially or peripherally disposed teeth 3' which engage in the wood of the propeller, forming thereby a reliable relative connection. The hub 13″ is secured to the conical part 28 of the shaft 1, as described in connection with Fig. 3, but the thread portion 29' of the shaft here is relatively short and coöperates with a cap nut 33'. The cup shaped enlargement 31 of the hub 13″ which supports the flange 4 is extended forwardly with an external thread 40 and terminates in axially extending teeth 41. Into the recess between these teeth 41 engage similar teeth 43 correspondingly extending from the inner face of a lock cap 42 (Fig. 10). The latter is provided internally with a dodecagonal flange 44 which snugly fits over the correspondingly faced cap nut 33' and is secured in position by a central screw 45. Rotation of this castellated lock cap 42 relative to the hub and to the motor shaft is thus effectively prevented, as is also inadvertent loosening of the cap nut 33'. The lock cap 20″, which by means of its flange 20' jams the cone head 19 against the flange 4, screws not onto the motor shaft as in the other constructions, but onto the threaded portion 40 of the hub cup-extension 31, and screw bolts 46 passing through the cap flange 20' and the contacting inturned cone rim prevent the cap 20″ from working loose.

This construction has the advantage that the load acting on the lock cap for the attachment of the propeller is not directly transmitted to a relatively small portion of the motor shaft.

Over prior constructions for securing the propeller to its shaft by means of bolts passing clear through the propeller my invention has the important advantage that for mounting or demounting the propeller only a single, centrally located screw (lock cap) need be manipulated. Owing to the centrically directed pressure of the lock cap, of the cone member, and of the flange 4 the propeller is pressed home uniformly all-around onto the hub or the flange 3 respectively which prevents one-sided "cut-under" or tilting of the propeller.

Furthermore a saving in propeller hubs is effected, since there is required a hub only for each motor and not, as heretofore, for each propeller. In demounting a propeller hub from the motor shaft it now often happens that the latter is injured, which need not be feared with my constructions. Aside from a considerable saving in material, there is also a large saving of time in mounting and demounting a propeller as proposed by me above.

The invention, obviously, is susceptible of various other modifications and hence I do not want to be understood as limiting myself specifically to the construction and arrangements of parts shown and described, and I must be allowed to reserve myself the right to make changes in the form, proportion and the minor details of construction without departing from the principle or sacrificing any of the advantages of my invention.

What I claim is:—

1. In a propeller fastening, in combination with a propeller, two flanges designed to clamp said propeller between them, a coaxially disposed cone-shaped member, a lock nut pressing said cone-shaped member against one of said flanges, and means operatively connecting said lock nut to the other flange through the central propeller bore, substantially as set forth.

2. In a propeller fastening, in combination with a propeller, two flanges adapted to clamp the propeller between them, a cone-shaped member, a lock nut screwing on the one end of a double nipple whose other end screws into a hub, and said lock nut designed to press said cone-shaped member against one of said flanges, the said two flanges being supported on said hub, and means for rigidly connecting the hub to the motor shaft.

3. In a propeller fastening, in combination, a propeller shaft, two flanges concentrically supported thereon, a propeller having a central bore clear through and adapted to be clamped between said two flanges, means laterally extending from the one of said flanges into the adjacent propeller boss face, the second said flange designed with capability of relative longitudinal displacement on the propeller shaft and contacting with the opposite propeller boss face, means for preventing relative rotation between this second flange and said propeller shaft, a cone-shaped member coaxially surrounding the shaft, and lockable means for pressing said cone-shaped member against said second flange.

4. In a propeller fastening, a propeller shaft, a terminal flange thereon, a propeller having a central boss bore clear through and a series of relatively short side bores in its one boss face arranged in a circle about the central bore, a hub extending through said propeller bore, a terminal flange on said hub and means for connecting said two flanges, means held in and extending through said two connected flanges and engaging in said side bores of the propeller boss, a constricted front end to said hub with grooves on the outside, a screw thread on the inside of said constricted hub end, a double nipple screwing with one end into the constricted front end of said hub, a flanged lock nut screwing onto the other end of said nipple, and means for preventing relative rotation between nipple and nut, a flange member dovetailedly supported on the grooved constricted end of said hub and contacting with the propeller hub, and a cone-shaped member interposed between the last named flange member and the said flanged lock nut, the parts being constructed, arranged and coöperating substantially as shown and described.

ALBERT RUPP.

Copies of this patent may be obtained for five cents each, by addressing the "Commissioner of Patents, Washington, D. C."